(12) United States Patent
Bjornestad et al.

(10) Patent No.: US 7,003,576 B2
(45) Date of Patent: Feb. 21, 2006

(54) MANAGED ACCESS TO INFORMATION OVER DATA NETWORKS

(75) Inventors: Anders Bjornestad, Oslo (NO); Jon Øivind Stenerud, Olso (NO)

(73) Assignee: Edvantage Group AS, (NO)

( * ) Notice: Subject to any disclaimer, the term of this patent is extended or adjusted under 35 U.S.C. 154(b) by 621 days.

(21) Appl. No.: 10/027,908

(22) Filed: Dec. 21, 2001

(65) Prior Publication Data

US 2003/0084345 A1   May 1, 2003

(30) Foreign Application Priority Data

Sep. 14, 2001   (GB)   .................................. 0122276

(51) Int. Cl.
*G09B 7/02* (2006.01)
*G06F 11/30* (2006.01)

(52) U.S. Cl. ........................ 709/229; 709/205; 713/189

(58) Field of Classification Search ................ 709/223, 709/205, 229; 434/118, 322; 717/124; 705/11; 715/513; 713/189
See application file for complete search history.

(56) References Cited

U.S. PATENT DOCUMENTS

2004/0030781 A1 *   2/2004   Etesse et al. ................ 709/225
2004/0091846 A1 *   5/2004   Aughenbaugh et al. ...... 434/350
2004/0153508 A1 *   8/2004   Alcorn et al. ................ 709/205
2004/0153509 A1 *   8/2004   Alcorn et al. ................ 709/205

FOREIGN PATENT DOCUMENTS

WO   WO2003026248   *   9/2002

* cited by examiner

*Primary Examiner*—Kamini Shah
(74) *Attorney, Agent, or Firm*—Synnestvedt Lechner & Woodbridge LLP

(57) ABSTRACT

A system for providing a user with access to an information site hosting information with controlled access, such as an e-Learning content provider. The user logs on to a management site such a learning management system and is authenticated by the management site. The user requests the management site for access to information which is hosted at the information site, and is logged on to the information site with authenticated access to the information. There is direct communication between the user and the information site, and also direct communication between the management site and the information site for exchange of management information. The management information comprises user authentication data provided by the management site, and data relating to the user's activities on the information site which is reported by the information site to the management site.

19 Claims, 11 Drawing Sheets

All courses - Microsoft Internet Explorer

File Edit View Favorites Tools Help

Koblinger ·Nyttig ·EDG ·produkinfo ·Leverandører ·Ressurser ·Media ·Domene

Address _____ Go

| | |
|---|---|
| ⌂ | Home |
| ✓ | My courses |
| ဏ | All courses |
| ? | Help |
| × | Logout |

All courses

These are all the courses that are currently available to you. You can create your own course catalogue by adding ☐ your chosen courses to the *My Courses* catalogue.
A course will automatically appear in *My Courses* when started ☐

Order by: Title | Vendor | Topic

☐ Advanced Presentation Skills
Communication / Meeting the Presentation Challenge (SkillSoft, COMM6325)

☐ Advancing your service expertise
Communication Relationship/ How to Excel at Customer Service (SkillSoft, CUST8104)

☐ Organization and management
Management / Organisation and Management (Berkeley Extension, X490.1)

☐ Loooz
Learning Resources / Games (Edvantage group, EDU001)

☐ Virtual Classroom MCF
Learning Resources / Classroom (Hewlett-Packard, ROOM982)

☐ Designskolen "Dessie"
Design / Design (Moving Skills, MP0002)

☐ SuperOffice test course
Information Technology / IT (Edvantage group, EDG003)

☐ Klasserom Gjensidige Nor
Learning resources / Classroom (Hewlett-Packard, ROOM547)

☐ Virtual Classroom MCE http://marvin.norway.edvantagegroup.com/Help.jsp?content=helpVendorFile&vendorID=3

MANAGED ACCESS TO INFORMATION OVER DATA NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the managed access to information over data networks such as the Internet or corporate local area or wide area networks. The invention is of particular interest in the field of learning management systems in which users are provided with access to educational content. However, the invention is also relevant to managing access of users to other types of information such as technical databases, financial data and so forth.

BACKGROUND TO THE INVENTION

Education has been a key process in the maintenance and development of every civilized society. In the 20 century, the development of methods and technology for remote education has become increasingly important. Distance learning using communication by mail has become a popular method of education which is of particular interest to those who are employed and do not have time for a full time education at a college. Broadcasting of educational material by radio or television at a predetermined time is another way in which educational material method. Another remote education method uses video media. It is also known to have a video conferencing system, in which a teacher and a student view each other via a video link. In one system, educational material is distributed through a general network. In this network a dedicated videophone system and a whiteboard system, which can share data via computers, are linked via a local area network (LAN) or a wide area network (WAN).

The above-described conventional remote education methods generally cause users to be restricted by time and/or location. It can be difficult to increase the number of users and prepare a variety of flexible educational contents.

With the increasing use of the Internet, remote learning systems have been developed which enable people to access educational courses from anywhere in the world, at any time, by using e.g. a browser such as Microsoft Internet Explorer (Trade Mark). An educational establishment hosts a site with one or more educational courses, and users who are registered may log on to the site and access the appropriate course. This type of system is often referred to as "e-Learning". In the last few years, computer systems that enable the delivery, management, and administration of enterprise-wide learning, known as Learning Management Systems (LMS) have become increasingly popular. Learning Management Systems are suites of tools that deliver the proper course or content to the students, at the proper time, in the proper format. An LMS typically provides registration capabilities for all types of learning events, student home pages, automated course catalogues, classroom resource management, skills management, records and content keeping, and delivery of e-Learning courses. Marc J. Rosenberg describes a detailed definition in prior art of the core capabilities of an LMS, in E-Learning: Strategies for Delivering Knowledge in the Digital Age, McGraw-Hill Books, 2001 pp162. First, by this definition, the LMS may have a common online course catalogue, a common online registration system and an up-front competency assessment tool. The LMS may have the ability to launch and track e-Learning and perform e-Learning assessments and perform management of learning materials. After integrating knowledge management resources the LMS may perform customized reporting, support collaboration and knowledge communities and integrate the information into the respective system, e.g. a human resources system used in the management of an organisation.

In a conventional Learning Management System, the educational content is provided by a content developer and integrated into the LMS. For example, the information may be supplied by the content provider on one or more CD's or other media, and copied into the LMS system. A student interfaces with the LMS and the content is provided to the student by the LMS. This imposes limitations. The computing and network demands on the system will limit the number of users and the number of courses that can be accessed. There will also be problems if the content varies frequently, and this will be a particular problem if this type of system is used not only for education but also for accessing financial data or constantly changing databases of information.

Various learning systems are disclosed in U.S. Pat. Nos. 5,727,950; 5,802,506; 6,029,156; 6,032,141; 6,067,537; 6,073,841; 6,116,652; 6,135,776; 6,141,529; 6,148,174; and 6,201,948.

U.S. Pat. No. 6,149,441 shows a learning system in which users connect with a server via a school intranet or via the Internet. The server hosts a number of modules concerned with lesson management and content. All communications with a user are channeled through the server. U.S. Pat. No. 6,190,178 discloses an Internet based learning management system. A user with a PC connects through the Internet to a server. The server includes a network connector, a controller, a remote education execution unit, a database management unit and a database. All communications with the user are directed through the controller and the server's network connector. The controller deals only with the local components in the server, namely the remote education execution unit, database management unit and database.

SUMMARY OF THE INVENTION

Viewed from one aspect, the present invention provides a system for providing a user with access to an information site hosting information with controlled access, in which there is provided a management site remote from the information site, the user logs on to the management site and the user is authenticated by the management site, the user requests the management site for access to information which is hosted at the information site, the user is logged on to the information site with authenticated access to the information, and there is direct communication between the user and the information site, wherein there is also direct communication between the management site and the information site for exchange of management information.

In one preferred implementation of the invention, the management information comprises data relating to the user's activities on the information site. This is provided from the information site to the management site and stored on the management site for analysis. In another preferred implementation, the management information is user authentication data provided by the management site. Thus, the information site may carry out an authentication check using data provided by the management site to confirm that the user has been authenticated by the management site for access to the information. Preferably, both of these functions are provided.

Thus, in accordance with the invention it is possible to have the advantages of an LMS, for example, in terms of management facilities and ease of use for a user, whilst having the ability to provide a greater volume of information, in terms of the sources of information, quantity of information and number of users. The user communicates directly with the information site to receive the information, and it does not have to be integrated into and hosted on the management site. It will be appreciated that when using the expression "direct communication" it is recognized that there may be many lines of communication, intermediate servers and so forth in the physical path of communication. The significance of the expression is that the information is hosted remotely and is not stored locally as part of the management site, and that management information is not channeled through the user.

In a practical implementation, a user at a PC will log on to the management site using the Internet or a corporate Intranet. After conventional authentication routines, such as entering a user name and password, the user selects a course to which he or she is permitted access. The user's browser is then directed to the information site, and if appropriate, basic authentication information such as the user name and password can be passed automatically from the user to the information site. The information site will communicate with the management site to check that the user has been authorized by the management site to access the information, and when this is established the information such as a learning course will be presented in the conventional manner. However, the information can be presented on the user's screen within a standard format defined by the management site, so that the user has a standard interface regardless of the source of information. When the users logs out of the system, the information site provides management information to the management site. In the case of an educational course, this could be a progress report, time spent, standard reached and so forth. In the case of a technical database, the management information could include details of the number of documents requested and the fees payable. Preferably, the management site and information site use an identifier to denote a particular session, and not just a particular user, to monitor access to the information.

The protection sought is not limited to the system as a whole, whose components could be distributed over a number of countries, but to individual components.

Thus viewed from another aspect the present invention provides data processing means for use at a management site in the system described above, configured to provide a user with access to an information site hosting information with controlled access, the data processing means being arranged to authenticate a user, to receive a user request for access to information which is hosted at the information site, to arrange for the user to be logged on to the information site with authenticated access to the information by means of direct communication between the user and the information site, the data processing means also establishing direct communication between the management site and the information site for exchange of management information.

Viewed from another aspect, the present invention provides data processing means for use at an information site in the system described above, configured to receive a request from a user for access to information, to communicate directly with the user for supply of the information, and to communicate directly with the management site for exchange of management information.

Viewed from another aspect the present invention provides computer software which when run on data processing means will configure the data processing means for use in a management site or information site as set out above. the software may be provided on physical media such as a CD-ROM or tape, or as signals from a remote site sent over e.g. a network such as the Internet, or by means of terrestrial or satellite broadcasting, for example.

In the following discussion of preferred features of the system, a system in accordance with the invention will be referred to as an "Open Learning Management System" or "OLMS".

In a preferred implementation of the invention, a single source system (SSS) operates as a hosted solution through a portal on a digital distributor such as the Internet and seamlessly integrates content from different sources, using technology and services in an open learning management system (OLMS). The OLMS implements the material into a form suitable for a student, in the case that the content is e-Learning. Using a course tracking system, the OLMS logs all the activities performed with the content and the resources by the users of the system and stores the activity information for future use. Use may be by company human resources (HR) systems/organizations where the students are employed, or other customers. A log of activity generated by the students of the SSS is provided, either as data exchange, or as an integrated part of the external receivers of resources and systems. A major advantage of the system is that the students do not need logins at the external content developers, specialist technology in the form of hardware/software, or retrieval of any specialist services, but obtain all elements needed for e-Learning at one point.

The OLMS preferably has all the capabilities of a state of art LMS. In addition, the functionality of the OLMS is integrated in a portal solution, and is open in a way that any content can be integrated, and data exported to any HR systems. A prior art traditional LMS including content managed by the LMS is located at a specific computer such as a server, e.g. in a specific database, and the content needs continues updating. As opposed to this, an important advantage of the OLMS is that the system manages content that may be located at other computers, databases or on the servers of external content developers. Consequently, a server comprising the OLMS of the present system has a "peer to peer" communication directly with the servers of the external content developers. This gives two important advantages for the user of the system, namely it provides flexibility to be able to compose the learning program freely according to needs, and the students do not need logins at the sites of the content developers.

The content developers, i.e. the agents/vendors developing content may be of various types. There are various schools, universities, companies that develop content for digital distribution, and also organizations that develops company/organisation specific or general content. A typical course comprises a sharable, educational object consisting of one or more "Assignable Units" (AU's) which are the smallest units of information that the system assigns and tracks. An AU is part of a course or an education program that gives the learner understanding of a specific subject. As opposed to e.g. typical university courses, that often have a fixed pattern of functionalities and facilities, courses built of AU's may be flexible and changeable to be adapted to the users need. Content may also be divided into content objects which are self-contained or self-instructive units of content, such as a chapter of a course on a specific subject.

The course is preferably described by a specific standard. For example, a course may be exemplified by, but not limited to, the SCORM (Sharable Content Object Reference Model) standard. SCORM™ is a reference model that defines a Web-based learning "content model" and is a set of interrelated technical specifications, that designed to meet e.g. the demands of authorities for a high level reliable and robust standard. SCORM is a standard to generate an evolving document to collect all the "bits and pieces" in one place.

The content may be any information provided by external vendors for the OLMS to provide to the users of the single source system. This may include e-Learning/Educational resources such as courses, presentations, activities, assessments, tutors etc. The content could be any combination of text, graphics, video and audio. The content could be a combination of synchronic (live or not) or asynchronic education. Synchronic learning is learning that is dependent on time. Users can only access content at scheduled sessions. The synchronic learning content could be pictures and audio of a teacher, either live or recorded and played back at a specified time. By contrast, a-synchronic learning is learning that is independent on time, that makes it possible for the user to receive any part of the education at any time.

The content could be an MBA program or a language course, for example. It may be divided into categories such as general education, working skills, and personal development. An MBA program is an example of general education. Working skills content is related to the learner's working situation. Content for personal development could be time management and language skills. The expression "soft skills" can be applied to non-technology-related, people-oriented skills such as leadership, marketing, and human relations. A complete, shareable learning program could be composed of a combination of various content, with the purpose of providing knowledge, training or education to a user within a specified field.

Implementation of a system will involve the stepwise process of choosing content, building solutions (such as portals and communities), implementing follow-up systems and design, and support implementation programs. A portal is a doorway or gateway to content on a computer network. The portal can serve as a single location where the users access content. An e-Learning portal can be educational content consolidated into one web site that is accessible to the users.

A user is a verified and identified person or program accessing the system. The user is given access to content based on access rights given by system administrators. The users could be organizations, groups of persons or single persons. Students, administrators and HR systems are examples of users. A student is a single human user of the content. An administrator is a company, organisation or person who administers the OLMS and arranges for the single source solution to be provided to users.

The preferred system meets the need of seamless integration of content from external content developers, providing flexible availability of the content to users in a single system, making it possible for the users to compose their own learning programs.

BRIEF DESCRIPTION OF THE DRAWINGS

Some preferred embodiments of systems in accordance with the invention will now be described by way of example and with reference to the accompanying drawings, in which:

FIG. 8 is a screen shot of a typical list of courses available in a system in accordance with the invention;

FIG. 12 is a screen shot of a user profile update screen in a system in accordance with the invention;

The following description contains computer code which is subject to copyright protection and the Figures show text and screen layouts which are also subject to copyright protection. Attention is drawn to the copyright notice at the commencement of this specification.

DESCRIPTION OF THE PREFERRED EMBODIMENTS

Figure 1:
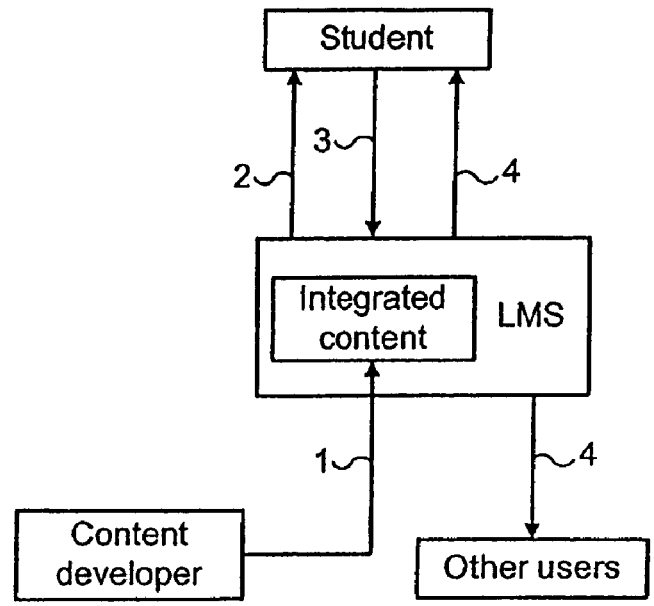
FIG. 1 is a diagram showing the organisation of a prior art traditional Learning Management System.

FIG. 1 shows a conventional LMS system. As shown at 1, a content developer delivers content that is integrated into the LMS. At 2, a student accesses the content by entering the LMS system. At 3, use of the system and content by the student is tracked by the LMS. At 4, information about user activities is accessed from the LMS by the student and other users such as administrators.

Figure 2:
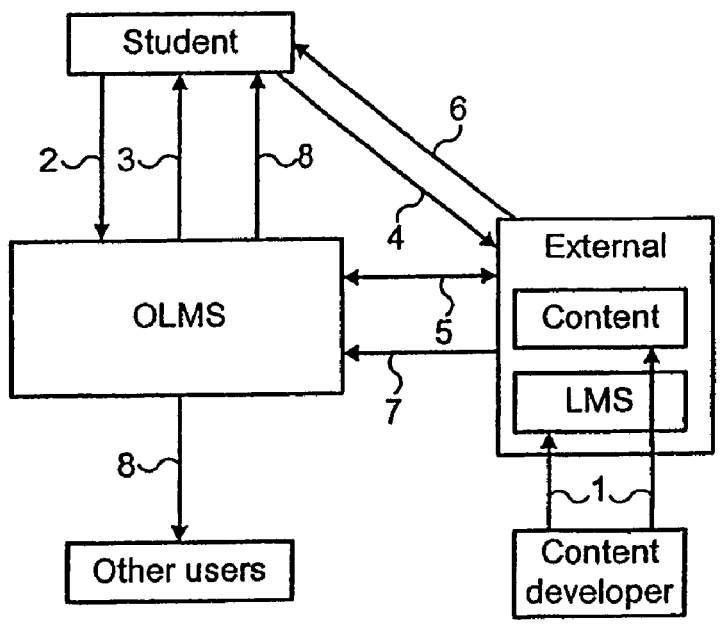
FIG. 2 is a diagram of one embodiment of a system in accordance with the invention.

FIG. 2 shows how the OLMS in accordance with the present invention is configured. At 1, a content developer produces external content, and in this case it is integrated into an LMS such as an on-line university education system. At 2, a student accesses the OLMS and requests access to content. At 3 the OLMS provides instructions for communicating with the external content. At 4, the student accesses the external content system directly, and at 5 the OLMS deals directly with the external system to authorize the student. The student then accesses the external content directly, at 6. At 7, the external system reports to OLMS, and at 8 information is made available from OLMS to the student and other users.

Figure 3:
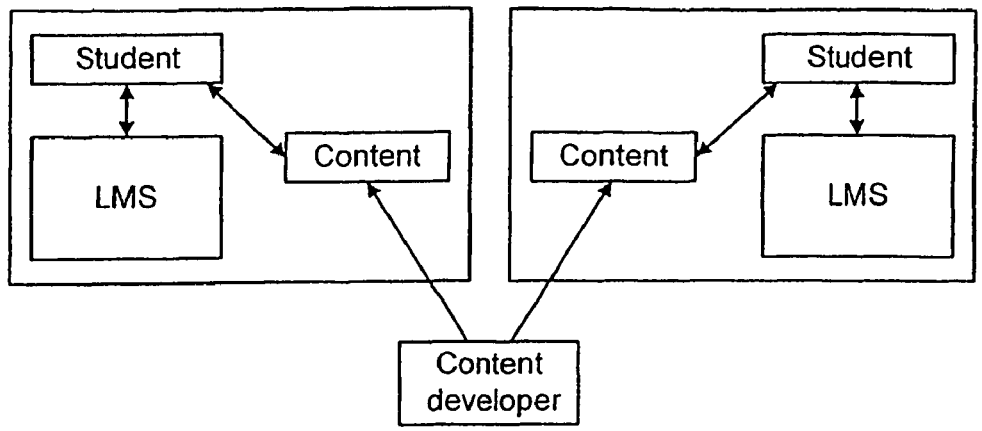
FIG. 3 diagram showing the organisation of a prior art traditional Learning Management System showing how multiple users are handled.
Figure 4:
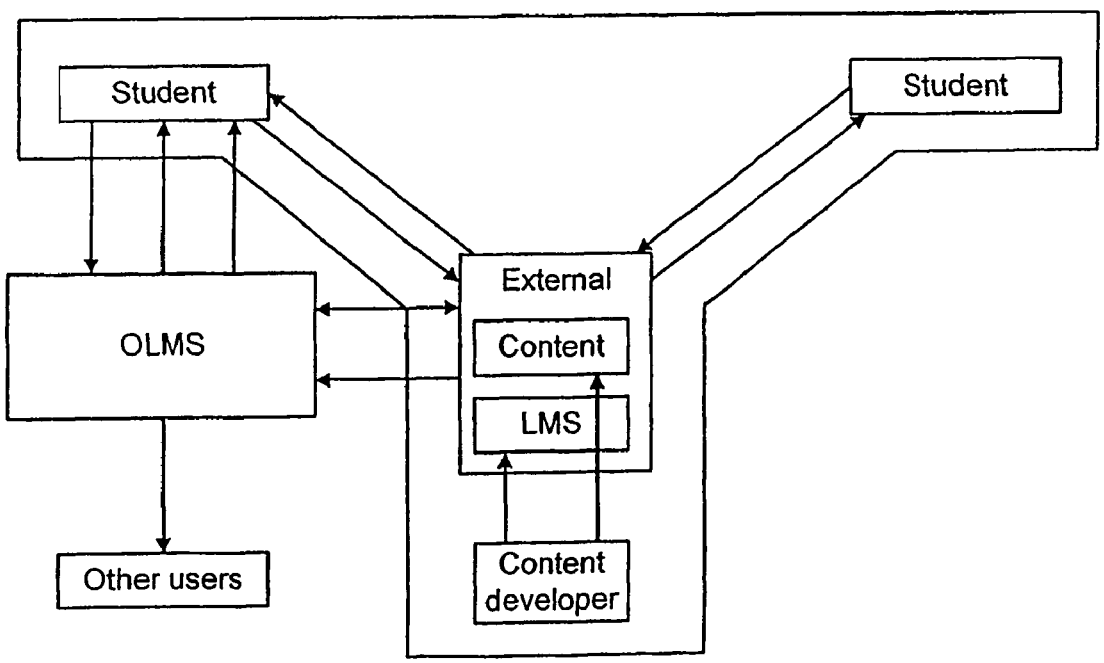
FIG. 4 is a diagram of one embodiment of a system in accordance with the invention, showing how multiple users are handled.

FIG. 3 illustrates a prior art method of including other students. The content developer provides content which a student accesses in an LMS. The students are isolated within the organisation/LMS system. The content developers produce a single copy of the content for each LMS and the student accesses this copy, not a learning environment of the content developer. The information is limited to the LMS. In FIG. 4, by contrast, The content provider provides content to an LMS, as in FIG. 2. By means of the OLMS at a particular organisation, a student can access this content as can other students at the same organisation. External students, not connected with the organisation, can connect to the LMS in the normal manner. Students from different companies or organizations, or private individuals, can be connected in a common virtual learning environment. Information to a student includes results from the total learning environment within the external content developer.

Figure 5:
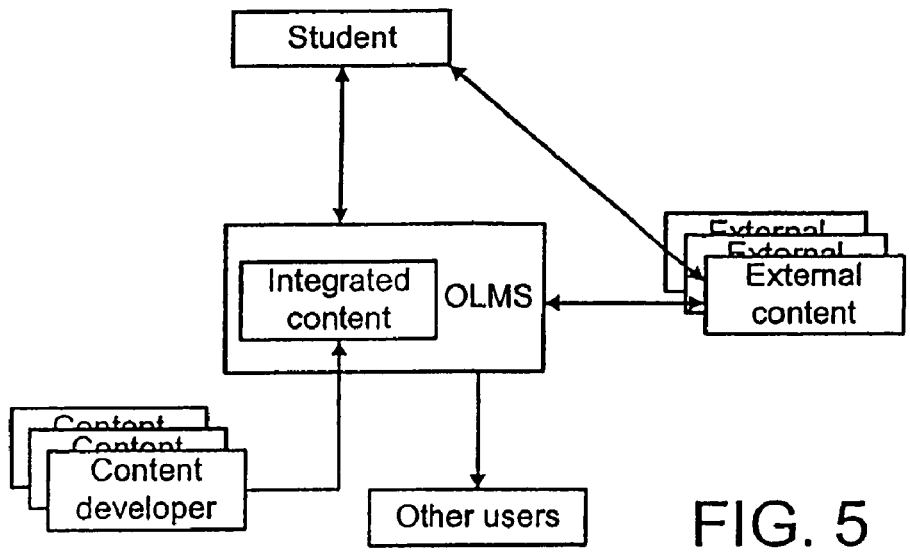
FIG. 5 is another overview of a system in accordance with the system.

FIG. 5 is an overview of a system in accordance with the invention, in which the OLMS may contain integrated content from content developers, as well as the external content which students will be connected to directly. The student accesses all content from a single source, and the content is not limited to specific standards or formats. The student may obtain information from both the OLMS and the external content providers,. Other users could be not only companies, organizations or individuals, but also systems such as a human resources system.

Figure 6:
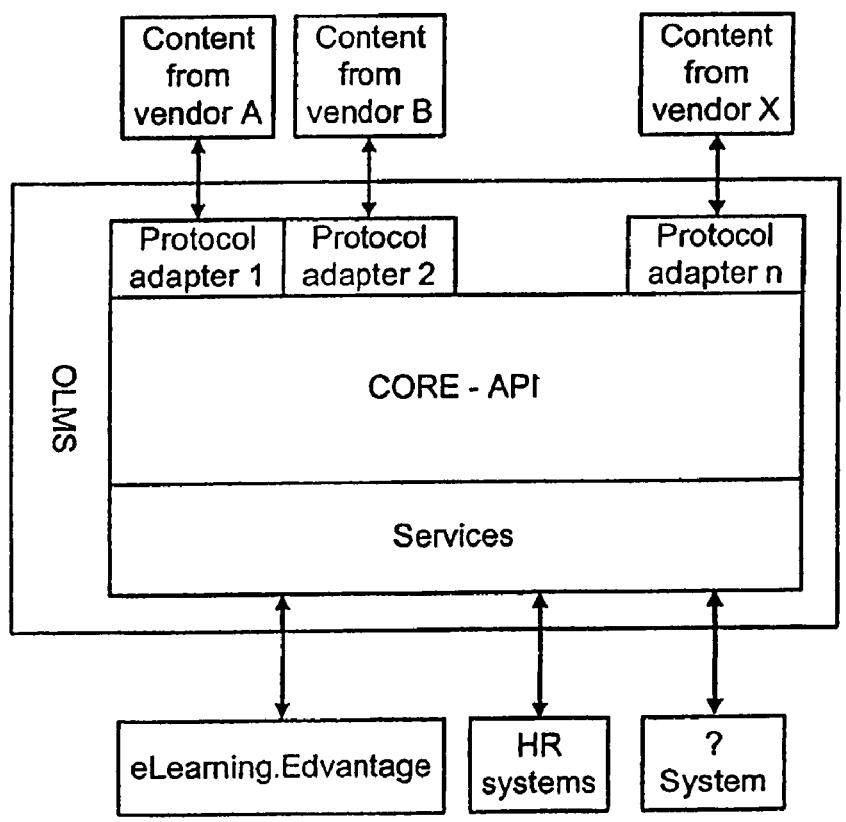
FIG. 6 is a more detailed schematic overview of part of a system in accordance with the invention.

As shown in FIG. 6, At the heart of the Open LMS is the Core API (Application Programmer's Interface). This API provides access to the core business logic with generic functionality for storing, retrieving and manipulating content information and data related to user activities. Content objects are integrated with the OLMS by adding a thin layer of protocol adapters on top of the Open LMS Core API, illustrated as Protocol Adapters 1 to n which are associated with content from vendors A to X. The adapters are responsible for launching the content objects and for exchanging user activity information with them. This means that there is no need to change the complex business logic of the core API to integrate a new type of content object. It also means that the OLMS can support the different e-Learning standards as well as the proprietary formats often used in more complex academic courses and such like. The adapters map the request formats used by the different content objects to the formats used in the core API to exchange user activity information. All information about the content objects themselves and their related user activities, is stored in a uniform way regardless of the original format. Other systems using the services provided by the OLMS may then completely disregard the different technical implementations of the content objects.

As noted earlier, the adapters are responsible for launching the content objects. The content objects themselves may be hosted externally on another server than the OLMS. To access these externally hosted content objects, the OLMS also handles authentication of the individual user on the external server. This is accomplished by appropriating information stored in the OLMS to the formats and methods used by the remote content server for launching the course. In other words, the user needs only interact consciously with one system regardless of where the content objects are actually located and what technology they are based on.

A significant advantage for the student is that due to the openness in the system, he/she has one access point to all e-Learning content, access to external content without anew log in, and being a part of an extended (more than company's or a particular provider's) e-Learning network. The user's experience of the content is the same whether it is integrated and hosted by OLMS or external content hosted by external content provider. The student accesses one course catalogue where all the content is presented the same way. Thus, the following are presented and work in the same way:

Information
Accessing of content
Information of status/score etc
Other functionality Information like course, functionality and vendor descriptions are presented identically throughout the portal. The course structure (course ID, topic areas) are built and presented the same way independent of vendor. The student uses the same functionality to access "free" content, getting information of applying for restricted content regardless of vendor or signing up for use of other resources like virtual classroom sessions. Available information is presented the same way to the student even if the courses are hosted externally.

Figure 7:
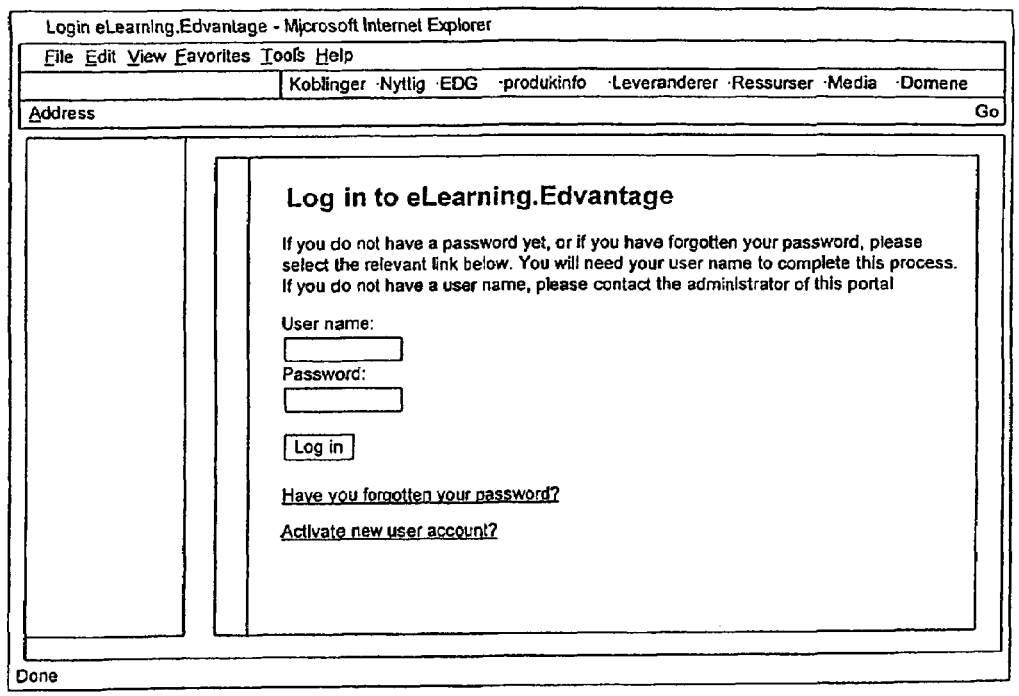
FIG. 7 is a screen shot of a user logon screen in a system in accordance with the invention.
Figure 9:
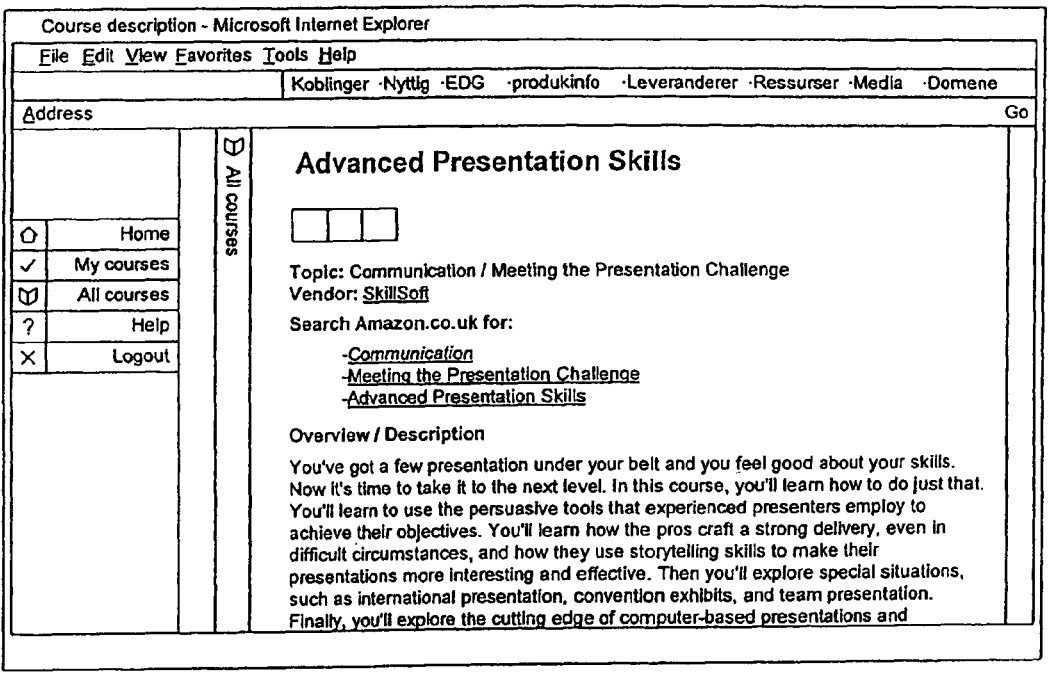
FIG. 9 is a screen shot of information about a typical course in a system in accordance with the invention.
Figure 10:
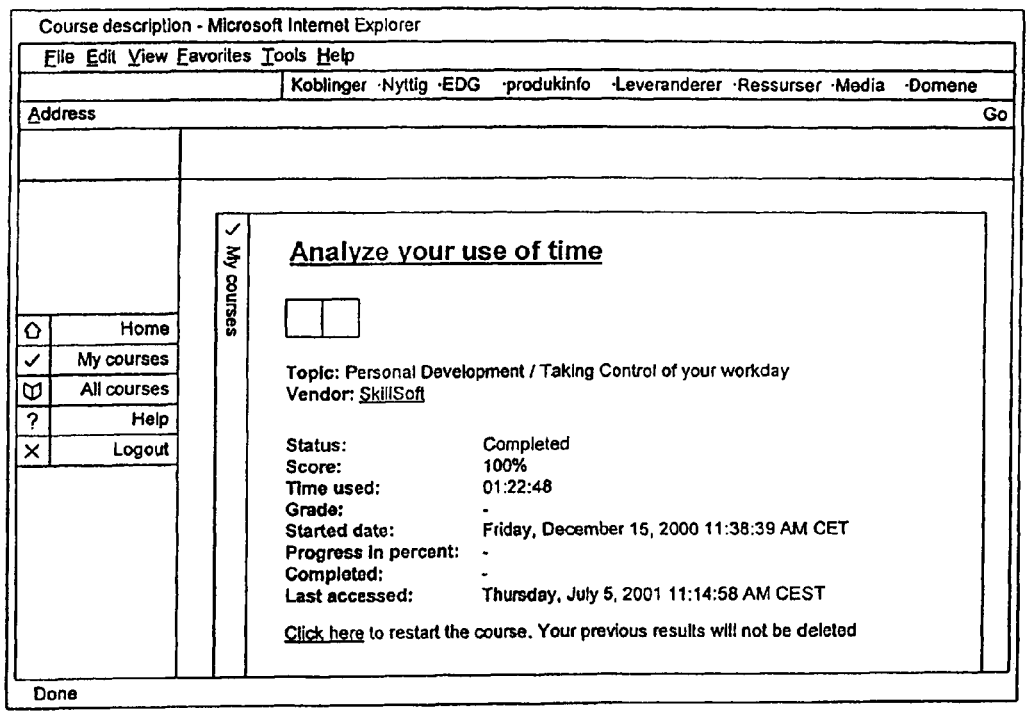
FIG. 10 is a screen shot of information about user activity on a course in a system in accordance with the invention.

As shown in the screen shot of FIG. 7, a user logs into an OLMS (in this case "eLearning.EdVantage") in accordance with the invention by giving a user name and password. FIG. 8 shows how a user can have access to a range of courses, provided by different sources. FIG. 9 shows how the OLMS, using the same interface, enables a student to have access to a course—in this case a course on "Advanced Presentation Skills" provided SkillSoft™. From the same screen, the user can search for additional resources e.g. by looking for books through "Amazon.co.uk" ™. As shown in FIG. 10, a student may access information on course progress, scores etc. provided by the external course provider, still using the same interface.

Figure 11:
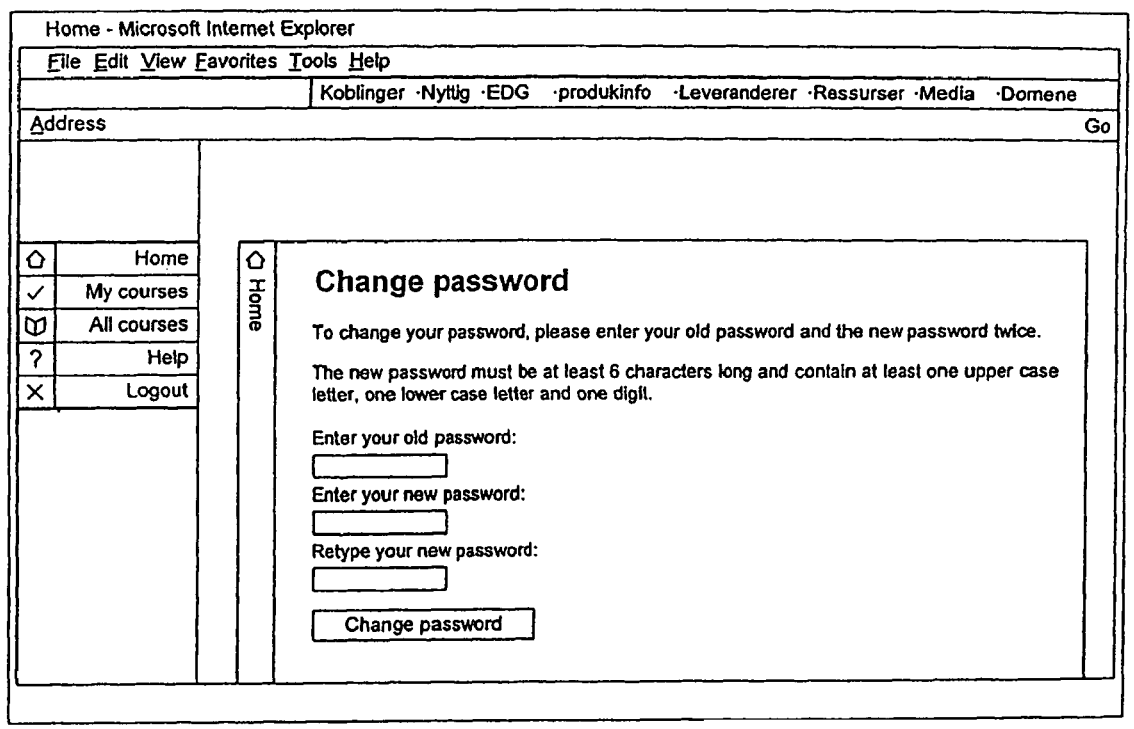
FIG. 11 is a screen shot of a change password screen in a system in accordance with the invention.
Figure 12:
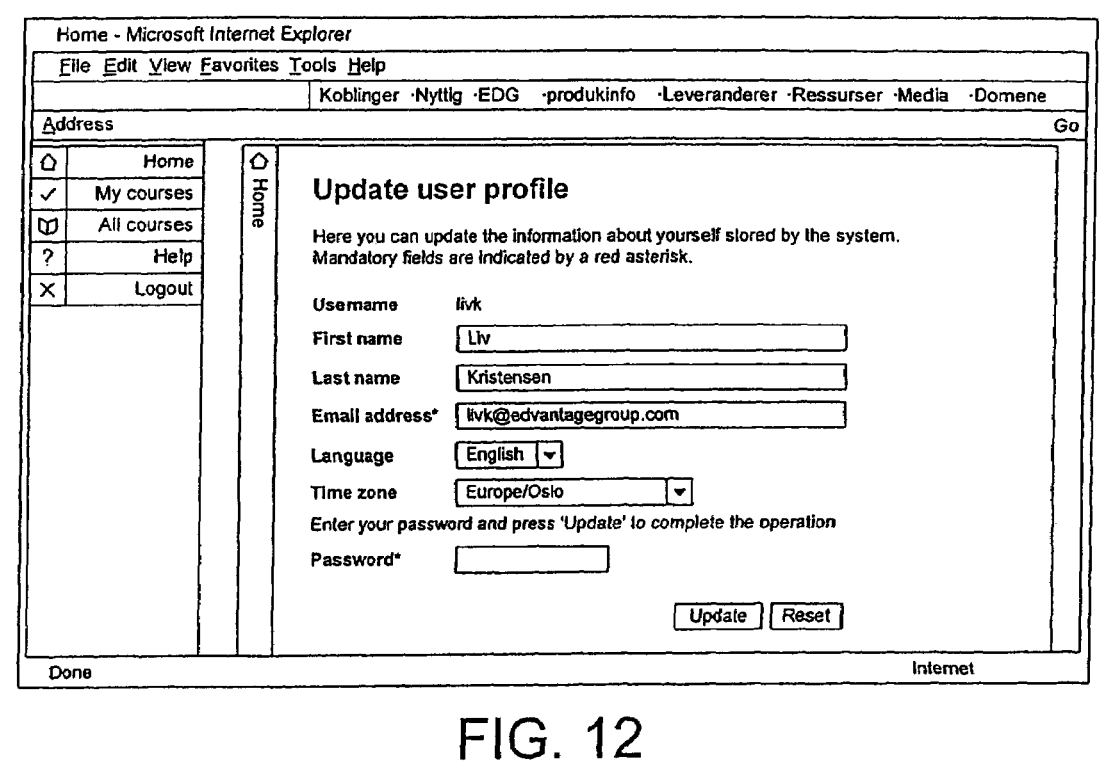

Additional functionality is also consistent throughout the portal. This includes updating a user's password or profile as shown in FIGS. 11 and 12. This may include customization of language and time zone. It is easy for a student to create a personalized curriculum or course list by adding and removing courses to "My Courses" using simple icons. The system may also print a diploma for completed courses.

A particular advantage to other users/administrator is the openness in the OLMS which make it possible to use information as input in any existing HR system. This means one report can be provided with statistics/metrics etc. including all different vendors/systems. It also provides a consistent way to:

Add and remove users
Add and remove content
Obtain statistics of system access, course started, course completed etc.
Set restrictions
Give access to restricted content
Schedule "meetings" in a virtual classroom
Access other resources Some content may be restricted and require specific attention. This could be caused by high cost of a particular course, or a course with a fixed starting date. In this case a student would get an application form or instructions from the system.

Collaboration tools are provided, for example to provide a virtual classroom and similar. Users can be given on-line lecturers and presentations, and can give input/feedback.

Figure 13:
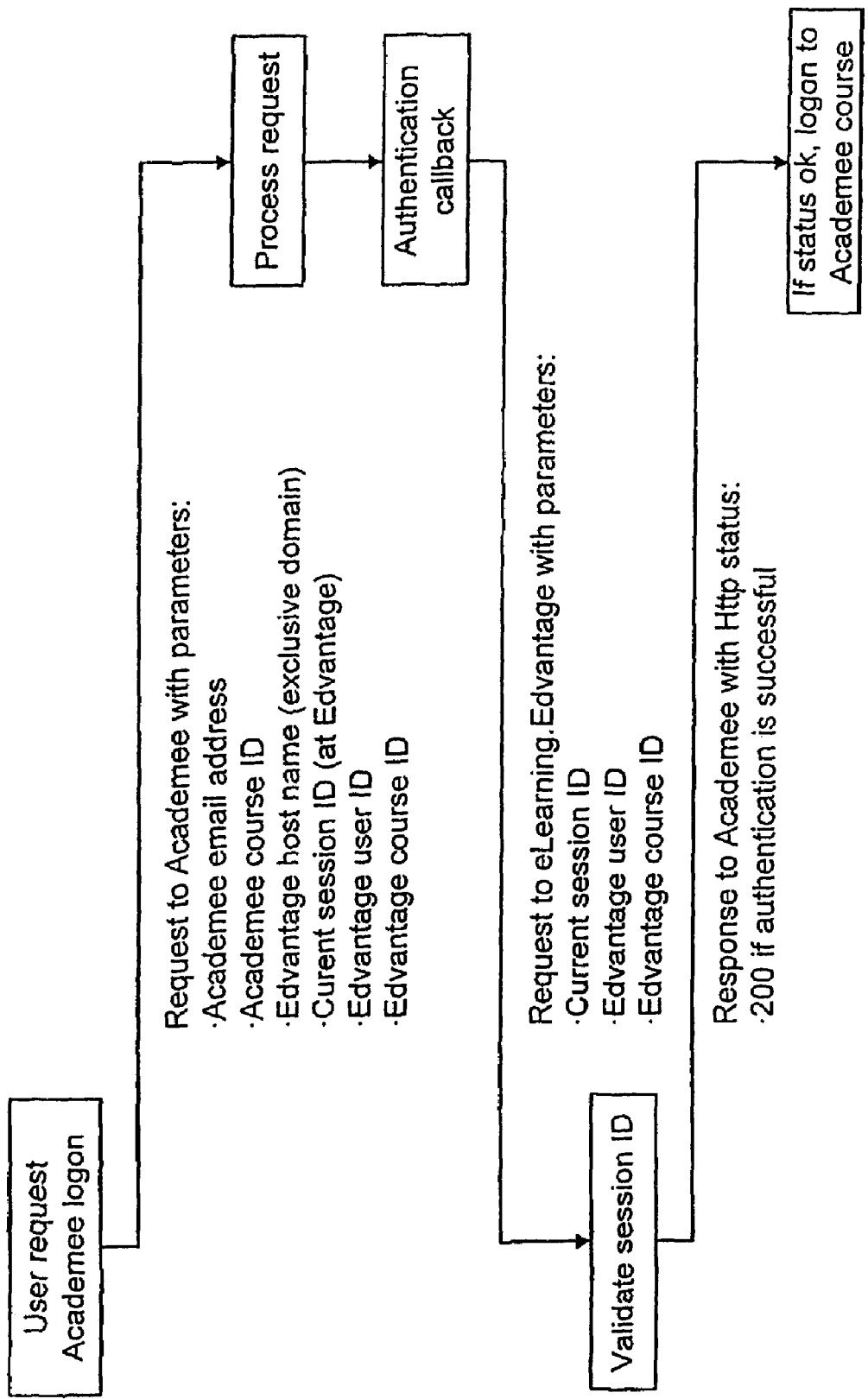
FIG. 13 is a diagram showing what happens when a user wants to access a course in a system in accordance with the invention.

FIG. 13 is a diagram showing the steps taken when user connects to the OLMS ("Edvantage") and requests access to a course. In this example it is a course provided by an external vendor "Academee" ™. The user requests logon to Academee. A request is made to Academee with the following parameters:

The Academee email address for the user requesting the course—acdmEmail
The Academee ID of the requested course edgHost—acdmCourseID
The Edvantage host name exclusive domain—edgHost The current session ID at Edvantage—edgSession
The user's ID in Edvantage—edgUserID
The Edvantage ID for the course—edgCourseID
The request is processed and there is an authentication callback to Edvantage with the following parameters:
    Current Session ID
    Edvantage User ID
    Edvantage Course ID
The callback to Edvantage is sent as a "GET" to the host:

http://<host>.edvantage.net/servlet/SessionValidatorServlet?edgSession=<edgSession>&edgUserID=<edgUserID>&edgCourseID=<edgCourseID>

If the session ID is validated and authentication is successful, a response is made to Academee and the user will be logged on to the course.

Figure 14:
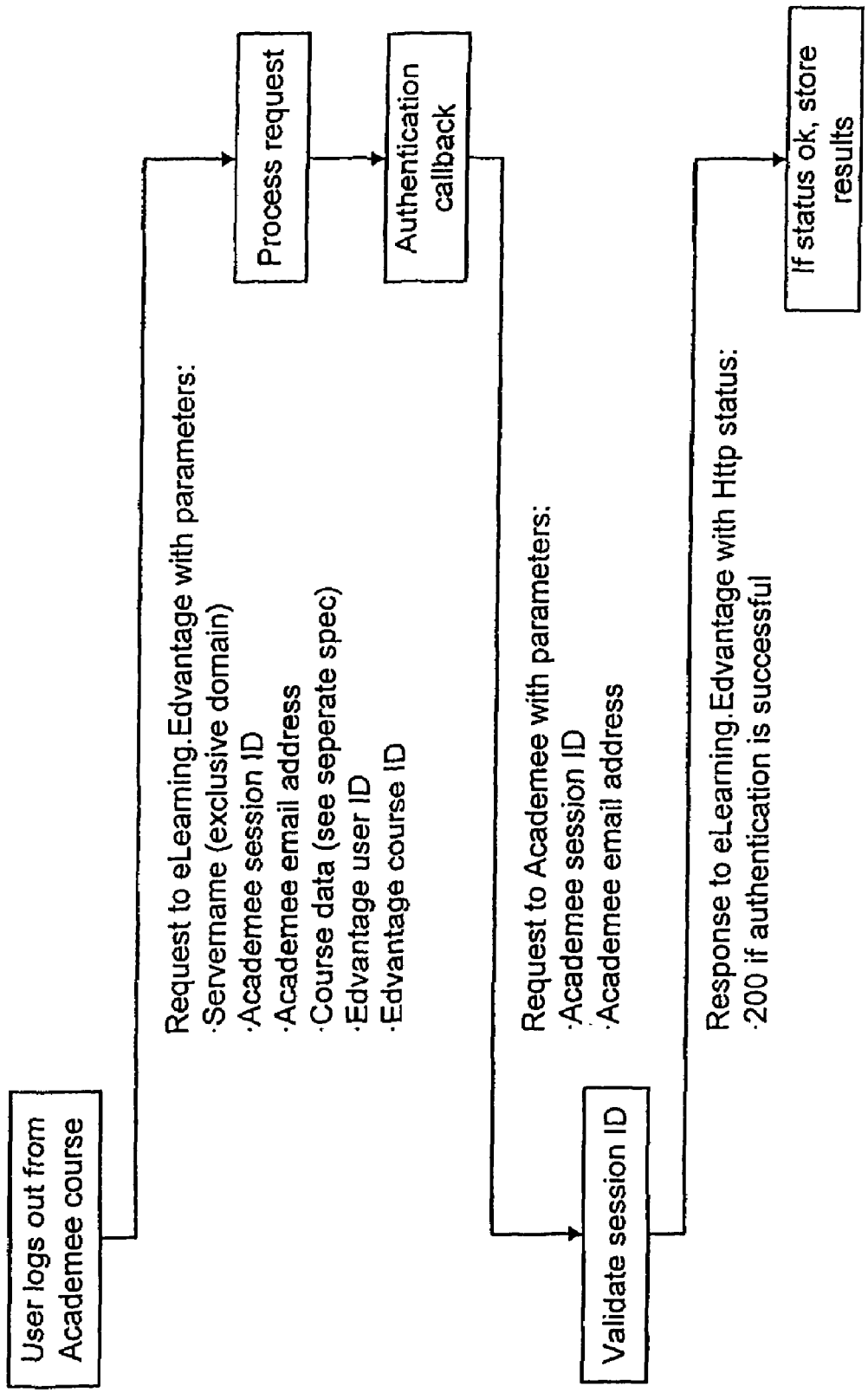
FIG. 14 is a diagram showing what happens when a user logs out from a course in a system in accordance with the invention.

When a user logs out from the course, the procedure is as shown in FIG. 14. A request is made to Edvantage with the following parameters:
    Servername (exclusive domain)
    Academee session ID
    Academee email address
    Course data
    Edvantage user ID
    Edvantage course ID
    The Course Data could be as follows:
    edgUserID—the user's ID in Edvantage
    edgCourseID—Edvantage's ID for the course
    acdmSession—current Academee session ID
    acdmCourseID—Academee course ID
    acdmEmail—Academee email address
    firstaccess—date of first access ('yyyy-mm-dd hh:mm:ss')
    lastAccess—date of last access ('yyyy-mm-dd hh:mm:ss')
    visits—the number of visits
    activitiesCompleted—the number of completed activities
    activitiesRemaining—the number of remaining activities
    sectionsCompleted—the number of sections completed
    expectedCompletionDate—the expected completion date ('yyyy-mm-dd hh:mm:ss')
    percentageCompleted—the percentage completed The request is processed and there is an authentication callback, i.e. a request to Academee with parameters Academee session ID and Academee e-mail address. The session ID is validated and there is a response to Edvantage if authentication is successful. If the status is OK, then the results are stored.

The system described above is a single source educational system providing e-Learning. It is operated over a hosted solution in a computer network such as the Internet. The educational system provides individual or corporate e-Learning in a computerized or digital form and provides educational content in a standardized form, technology in the form of hard skills and soft skills for the system to be functional and services for the user of the system. One advantage of the system is that it is unnecessary for the user to log into other sources than the portal including the OLMS to receive the complete e-Learning. The present invention may comprise standard learning objects as described above. An important purpose of using standard learning objects, for example AU's (Assignable Units) as defined above as a tool, is for the system user to adapt his learning program as flexibly as possible. The AU's may be originated at a first server used by the developers of technology or content, or may be provided by the OLMS system on the server providing the e-Learning to the user of the system. In this way, a specific curriculum or learning program may be adapted and offered to the specific user.

Another advantage of the system is that the content developer may generate reporting, not only between the user and an external system, but also between the external systems, in a way that is not visible to the user of the system. Thus, the user is not distracted. The system is such that as viewed from the user, the system is a single source of content and/or resources from different sources standards as well as proprietary, 100% hosted environment. Thus, the customer does not need to invest in hardware, software or any kind of technology platform. Yet another advantage of the system is that there are significant commercial benefits related to selling and providing the service with monthly or quarterly fees based on level of content and resources and number of users. This give a low risk for a user of the system arranging e-Learning to a group of individual users, because of the low need to invest in different systems to provide the e-Learning. Other advantages provided by the system are uniform description and access to content, uniform reporting to both user and other systems such as HR systems, and single sign-on and identification. The user "goes to" the learning directly, and not the other way around.

It will be appreciated that there will be many variations and modifications to the preferred embodiments as described above, which are for illustrative purposes only. The scope of the invention is defined by the appended claims.

What is claimed is:

1. A system for providing a user with access to an information site hosting information with controlled access, the system comprising:
    a management site remote from the information site, the management site comprising:
        a means for authenticating the user when the user logs onto the management site,
        a means for processing a request by the user for access to information which is hosted at the information site,
        a means for logging the user on to the information site and providing authorization to the information site to thereby authenticate the user's access to the information, and
    wherein the system further comprises:
        a means for direct communication between the user and the information site for the supply of information from the information site to the user, and
        a means for direct communication between the management site and the information site for exchange of management information.

2. A system as claimed in claim 1, wherein the management information comprises data relating to the user's activities on the information site which is provided from the information site to the management site and stored on the management site for analysis.

3. A system as claimed in claim 1, wherein the management information is user authentication data provided by the management site.

4. A system as claimed in claim 1 wherein the management site hosts an open learning management system and the information site is an external learning content provider.

5. A system as claimed in claim 4, wherein the open learning management system enables access to a plurality of external learning content providers.

6. A system as claimed in claim 5, wherein the open learning management system also hosts integrated learning content.

7. A system for providing a user with access to learning content on an information site hosting information with controlled access, the system comprising:
- a management site which is remote from the information site and which hosts an open learning management system, the management site comprising:
  - a means for authenticating the user when the user logs on to the management site,
  - a means for processing a request by the user for access to learning content which is hosted at the information site,
  - a means for logging the user onto the information site and providing authorization to the information site to thereby authenticate the user's access to the learning content, and
- wherein the system further comprises:
  - a means for direct communication between the user and the information site to provide the learning content to the user, and
  - a means for direct communication between the management site and the information site for exchange of management information which includes (a) data relating to the user's activities on the information site which is provided from the information site to the management site and stored on the management site for analysis; and (b) user authentication data for access to the learning content, the authentication data being provided by the management site.

8. A data processing system for use at a management site, configured to provide a user with access to an information site hosting information with controlled access, the data processing system comprising:
- a means for authenticating a user,
- a means for processing a user request for access to information which is hosted at the information site,
- a means for logging the user on to the information site and for providing authorization to the information site to thereby authenticate the user' access to the information, said means comprising direct communication between the user and the information site, and
- a means for establishing direct communication between the management site and the information site for exchange of management information.

9. A data processing system as claimed in claim 8, wherein the management information comprises data relating to the user's activities on the information site which is provided from the information site to the management site and stored on the management site for analysis.

10. A data processing system as claimed in claim 8, wherein the management information is user authentication data provided by the management site.

11. A data processing system as claimed in claim 8, configured as an open learning management system providing access to an information site provided by an external learning content provider.

12. A data processing system as claimed in claim 11, wherein the open learning management system provides access to a plurality of external learning content providers.

13. A data processing system as claimed in claim 12, wherein the open learning management system also hosts integrated learning content.

14. A data processing system for use at a management site hosting an open learning management system, configured to provide a user with access to an information site hosting information provided by an external learning content provider with controlled access, the data processing system comprising:
- a means for authenticating a user,
- a means for processing a user request for access to information which is hosted at the information site,
- a means for logging the user on to the information site with authenticated access to the information, said means comprising direct communication between the user and the information site, and
- a means establishing direct communication between the management site and the information site for exchange of management information which includes (a) data relating to the user's activities on the information site which is provided from the information site to the management site and stored on the management site for analysis; and (b) user authentication data for access to the learning content, the authentication data being provided by the management site.

15. A data processing system for use at an information site hosting information with controlled access, which is arranged to cooperate with a management site remote from the information site, the data processing system comprising:
- a means for permitting a user to be logged on to the information site via the management site with authenticated access to the information,
- a means for direct communication between the user and the information site for supply of the information to the user, and
- a means for direct communication with the management site for the exchange of management information.

16. A data processing system as claimed in claim 15, wherein the management information comprises data relating to the user's activities on the information site which is provided from the information site to the management site and stored on the management site for analysis.

17. A data processing system as claimed in claim 15, wherein the management information is user authentication data provided by the management site.

18. A data processing system as claimed in claim 15, configured as a learning content provider for use with a management site which is an open learning management system.

19. A data processing system for use at an information site hosting learning content information with controlled access, which is arranged to cooperate with a management site remote from the information site, the data processing system comprising:
- a means for permitting a user to be logged on to the information site via the management site with authenticated access to the learning content information,
- a means for direct communication between the user and the information site for supply of the learning content information to the user, and
- a means for direct communication with the management site for the exchange of management information which includes (a) data relating to the user's activities on the information site which is provided from the information site to the management site and stored on the management site for analysis; and (b) user authentication data for access to the learning content information, the authentication data being provided by the management site.

* * * * *